May 16, 1967 R. J. WIDLAR 3,320,439
LOW-VALUE CURRENT SOURCE FOR INTEGRATED CIRCUITS
Filed May 26, 1965
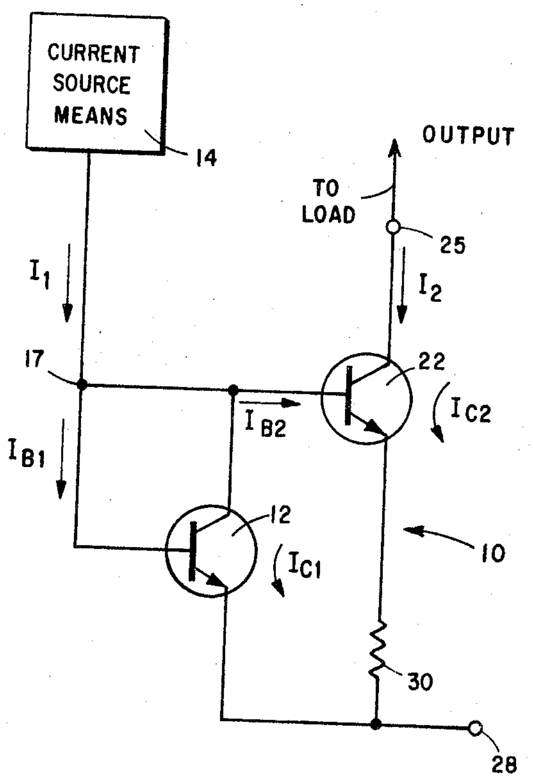
ROBERT J. WIDLAR
INVENTOR.
BY Roger S. Borovoy
Stuart Lubitz
ATTORNEYS

United States Patent Office 3,320,439
Patented May 16, 1967

3,320,439

LOW-VALUE CURRENT SOURCE FOR INTEGRATED CIRCUITS

Robert J. Widlar, Mountain View, Calif., assignor to Fairchild Camera and Instrument Corporation, Syosset, N.Y., a corporation of Delaware Filed May 26, 1965, Ser. No. 458,895
4 Claims. (Cl. 307—88.5)

ABSTRACT OF THE DISCLOSURE

A current source including a resistor and a pair of transistors having their emitters coupled to opposite ends of the resistor, one of the transistors having its collector and base shorted together; the device has a current supply coupled to the shorted collector and base of one of the transistors and to the base of the other transistor, allowing a small predictable difference in voltage to exist between the base-emitter voltages of the transistors which is coupled across the resistor to produce a small output current from the second transistor.

This invention relates to a current source and in particular to an integrated circuit current source for providing current of a few hundred microamperes or less.

In integrated circuits there is frequently a need for microampere current sources. To apply prior art techniques to obtain such a source would require the use of a relatively large resistor having a value of tens of thousands of ohms or more. The use of such resistors in integrated circuits requires excessive surface area and makes the circuit difficult to manufacture regardless of whether thin film or bulk integrated circuit techniques are employed.

To provide a microampere current source consistent with integrated circuit demands and to overcome the shortcomings of prior art circuits, a novel current source has been invented. This current source is based upon the principle that there is a predictable difference in the base-emitter voltages of two transistors operating at different collector currents. Using this principle, a current source may be constructed to supply a microampere current requiring a resistor of only several kilo-ohms or less. Such a resistor in an integrated circuit requires relatively small surface area and is easy to manufacture. Briefly, the structure of this invention comprises two transistors with their emitters coupled across a resistor and their bases and one of their collectors connected to a common point. By such an arrangement the difference in the base-emitter voltage of the transistors is coupled across the resistor. The resulting very small base-emitter difference voltage enables a microampere current to be supplied to the output terminal. This description of the invented structure will be better understood by reference to the detailed description which follows and to the sole drawing which is a schematic diagram of the invented circuit.

Referring to the drawing, a current source means 10 is shown for generating an output current having a magnitude in part dependent upon the current $I_1$ and the size of resistor 30. This current source includes transistors 12 and 22 which are shown as NPN transistors, but may be PNP transistors or similar solid state devices. Preferably, these transistors are formed in an integrated circuit arrangement. The techniques for forming integrated circuit transistors and the interconnections between such transistors are well known in the prior art as evidenced by such patents as U.S. Patent 2,981,877 and the article, "Microelectronics—Unlocking the Treasure Chest," by William Liben, Astronautics & Aeronautics, pages 20–27, April 1964. It should be understood that the term "solid state" as employed in this specification refers to common resistors, capacitors, inductors, transistors, thin film integrated circuits and bulk semiconductor integrated circuits as well as other devices, but excludes vacuum tubes or gas discharge devices. The term "integrated circuit" refers primarily to thin film integrated circuits, bulk semiconductor integrated circuits, or hybrid circuits.

The first transistor 12 has its base and collector connected to current source means 14 which operates the collector at a current $I_{D1}$ approaching $I_1$. Current source 14 is also connected to the base of transistor 22 which is preferably identical to transistor 12. The bases of the transistors 12 and 22 draw base currents $I_{B1}$ and $I_{B2}$, respectively, from current source 14. The connecting of the collector and base of transistor 12 to a common point 17 insures that transistor 12 is operated out of saturation. The transistor 22 has its collector connected to output terminal 25 which is in turn connected to a load (not shown).

The emitter of transistor 12 is connected to the common terminal 28 while the emitter of the transistor 22 is connected to the common terminal 28 via the current-determining resistor 30. The operation of the invented circuit is not substantially altered by placing a small resistor between the emitter of transistor 12 and common terminal 28, at least so long as the voltage drop across such an inserted resistor is not substantially higher than the emitter-base voltage differential between transistors 12 and 22.

The operation of the above-described circuit along with the advantages of this circuit arrangement can be understood in depth by considering the derivation of the expression for the difference in base-emitter voltage. The utilization of the difference between the base-emitter voltages of the transistors 12 and 22 is an important aspect of this invention. In order to determine this voltage difference, first consider the expression for the collector current of a transistor as a function of the emitter-base voltage, as follows:

$$I_c=I_s \exp.\left(\frac{qV_{BE}}{kT}\right) \quad (1)$$

where $I_c$ is the collector current, $I_s$ is the saturation current, $V_{BE}$ is the base-emitter voltage, $q$ is the electronic charge, T is the absolute temperature and $k$ is the Boltzmann constant. This expression is true for $V_{BE}$ greater than $4kT/q$, and for currents up to the upper limit where emitter contact and base spreading resistances become important, and down to where collector leakage currents cause trouble. Solving Equation 1 for $V_{BE}$ gives:

$$V_{BE}=\frac{kT}{q}\log_e\left(\frac{I_c}{I_s}\right) \quad (2)$$

This expression can be used to find the base-emitter voltage difference between two transistors:

$$\Delta V_{BE}=V_{BE1}-V_{BE2} \quad (3)$$

$$=\frac{kT}{q}\log_e\left(\frac{I_{c1}}{I_{c1}}\right)-\frac{kT}{q}\log_e\left(\frac{I_{c2}}{I_{s2}}\right) \quad (4)$$

$$=\frac{kT}{q}\log_e\left(\frac{I_{c1}}{I_{c2}}\right)-\frac{kT}{q}\log_e\left(\frac{I_{s2}}{I_{s1}}\right) \quad (5)$$

For equal collector currents, the Equation 5 becomes:

$$\Delta V_{BE}=\frac{kT}{q}\log_e\left(\frac{I_{s2}}{I_{s1}}\right) \quad (6)$$

Considerable testing has shown that for adjacent identical integrated circuit transistors, the value of $\Delta V_{BE}$ in Equation 6 is typically less than one or two millivolts. This is attributable to the proximity of the integrated transistors and to their similarity, along with the excellent thermal coupling between them. Conventional circuitry would not have such coupling nor would the transistors be so well matched. The value of $\Delta V_{BE}$ as expressed in Equation 6 is relatively independent of the current level since $I_s$ should be constant. For $I_{C1}/I_{C2}$ greater than about 2 the second term of the Equation 5 can be neglected with little resulting error. Hence, the emitter-base voltage differential between adjacent identical integrated circuit transistors operating at different collector currents is given by:

$$\Delta V_{BE}=\frac{kT}{q}\log_e\left(\frac{I_{C1}}{I_{C2}}\right) \quad (7)$$

It has been found that this expression is accurate within a few millivolts. The collector currents $I_{C1}$ and $I_{C2}$ are different values as determined by current means 14 and the current-determining resistor 30 in accordance with the particular design requirements. Thus, a predictable value of $\Delta V_{BE}$ is generated as described by Equation 7. It should be noted that $I_1$ and $I_2$ may be considered the same as $I_{C1}$ and $I_{C2}$, respectively, if the current gain of the transistors is greater than about 10. It can now be seen that the current through resistor 30 approaches the current $I_2$. With the current $I_2$ passing through resistor 30:

$$\Delta V_{BE}=R_{30}\times I_2 \quad (8)$$

$$R_{30}=\frac{\Delta V_{BE}}{I_2} \quad (9)$$

In a typical design procedure employing the invention, the currents $I_1$ and $I_2$ would first be chosen and $\Delta V_{BE}$ computed by employing Equation 7. Then the value of resistor determined form $\Delta V_{BE}$ and $I_2$. With present technology, the value of resistor 30 is typically in the range of 200 ohms to 20K ohms and preferably less than 10K ohms with output currents in the neighborhood of 5 to 200 microamperes and usually less than 200 microamperes. In one commercial embodiment, 20 $\mu$a. was obtained with a 5K ohm resistor.

From the above detailed description it can be seen that a low value current source has been invented which is completely suitable for integrated circuits. The circuit couples the base-emitter voltages of two similar transistors across a resistor. At predetermined operating collector currents the difference in these base-emitter voltages is predictable. This circuit utilizes this small predictable difference to lower the resistance value required for the current source by at least an order of magnitude. Such resistance lowering in turn brings the surface area of the integrated circuit within practical limits of the technology. In addition, the circuit with lower resistance requirements is easier to manufacture and is lower in cost.

While the above detailed description has shown the fundamental novel features of the invention as applied to a preferred embodiment, it will be understood that various omissions and substitutions and changes in the form and details of the device illustrated may be made by those skilled in the art, without departing from the spirit of the invention. For example, the transistors need not be identical since the emitter-base voltage differential of non-identical transistors is still predicable. It is the intention, therefore, to be limited only as indicated by the scope of the following claims.

What is claimed is:

1. A solid state current source for generating an output current, comprising:

a resistor;

a pair of transistors with their emitters coupled to opposite ends of said resistors, one said transistors having its collector and base shorted together; and a means having a single output coupled to the shorted collector and base of said one transistor for operating the collector at a first current, said output of said means substantially non-resistively coupled to the bases of both said transistors, whereby a small predictable difference in voltage exists between the base-emitter voltages of said transistors which is coupled across the resistor to produce a small output current from the second transistor.

2. A current source comprising:

a common terminal;

a resistor coupled to said common terminal; and a pair of transistors operatively coupled to apply the difference between their base-emitter voltages as substantially the entire voltage across said resistor, whereby the small predictable difference in these voltages enables resistors less than approximately 10K ohms to be employed to supply output currents less than 200 microamperes.

3. The structure defined in claim 2 wherein the base-emitter voltage of one transistor is coupled across said resistor via the base-emitter junction of said other transistor.

4. A current source comprising:

a terminal;

a resistor coupled to said terminal; and a pair of transistors operatively coupled to one another and said resistor to apply the difference between the base-emitter voltages of said transistors as substantial the entire voltage across said resistor, whereby the small predictable difference in base-emitter voltages between the transistors is employed to supply a microampere current to a load.

References Cited by the Examiner

UNITED STATES PATENTS

| | | | |
|---|---|---|---|
| 2,841,757 | 7/1958 | Shields | 323—22 |
| 2,888,632 | 5/1959 | Livezey | 307—88.5 |
| 2,963,638 | 12/1960 | Nuut et al. | 307—88.5 |

ARTHUR GAUSS, *Primary Examiner.*

R. H. EPSTEIN, *Assistant Examiner.*